United States Patent
Michnoff

[15] 3,660,997
[45] May 9, 1972

[54] ANTI-THEFT CHAIN LOCK FOR AUTOMOBILE COMPARTMENTS

[72] Inventor: David N. Michnoff, 7416 West Park Drive, Hyattsville, Md. 20783

[22] Filed: Jan. 9, 1970

[21] Appl. No.: 1,580

[52] U.S. Cl. ............................. 70/240, 70/93, 70/DIG. 57
[51] Int. Cl. ............................. E05b 65/19, E05c 17/36
[58] Field of Search ......... 70/240, 93, 58, 234, 259, DIG. 57; 292/264, DIG. 14; 24/116 R, 116 A; 85/52, 53

[56] References Cited

UNITED STATES PATENTS

| 2,550,203 | 4/1951 | Robinson | 292/262 |
| 3,125,875 | 3/1964 | Friedman | 70/93 |
| 3,315,502 | 4/1967 | Skrapits et al. | 70/240 |

FOREIGN PATENTS OR APPLICATIONS

| 1,009,135 | 2/1952 | France | 85/53 |
| 632,253 | 1/1962 | Italy | 85/52 |

Primary Examiner—Albert G. Craig, Jr.
Attorney—Shapiro and Shapiro

[57] ABSTRACT

The engine compartment of an automobile is secured against unauthorized access by means of a chain lock including a universally flexible chain, one end of which is simply but securely attached to the hood of the automobile and the other end of which is detachably engaged with a key-operated locking mechanism simply and securely attached to a portion of the engine compartment. The entire chain lock is hidden from view when the engine compartment is closed but becomes immediately evident when normal hood latch is released.

2 Claims, 5 Drawing Figures

PATENTED MAY 9 1972 3,660,997

INVENTOR
DAVID N. MICHNOFF

BY *Shapiro and Shapiro*

ATTORNEYS

ANTI-THEFT CHAIN LOCK FOR AUTOMOBILE COMPARTMENTS

BACKGROUND OF THE INVENTION

This invention relates to locks for securing the engine compartment of an automobile against unauthorized access and more particularly is concerned with a unique chain lock for preventing the opening of the engine compartment after the usual hood latch is released.

Automobile theft and the theft of parts of automobiles have become increasingly prevalent in recent years. For the first time Government regulations require the installation of special locks upon the steering columns of automobiles to combat thievery. However, such precautions do not dissuade thieves from stealing automobile components located under the hood, and skilled thieves are adept at removing an entire engine within a very few minutes. Moreover, the newly required locks tend to increase the loss of older vehicles which do not have such locks. It is therefore highly desirable to provide a secure lock for the engine compartment of automobiles and thereby to prevent access to components under the hood, especially the ignition system.

Prior attempts to solve the foregoing problem have not been entirely successful. For example, the hood locks disclosed in U.S. Pat. No. 3,315,502 and U.S. Pat. No. 3,115,764 have rigid mating parts which require careful and skillful installation to ensure proper alignment and which hamper adaptability of the locks to diverse makes of vehicles. Moreover, the locks, when installed, are readily apparent from the exterior of the automobile, thereby permitting a thief to take adequate preparatory steps to overcome the locks. The hood lock disclosed in U.S. Pat. No. 3,273,935, while invisible from the exterior of the automobile after installation, employs a separate padlock in conjunction with mating parts which must be carefully aligned.

It is essential to the commercial success of an automobile hood lock that the lock be moderate in cost, simple to install on almost all automobiles with minimum of tools and skill, and difficult to remove after installation. Moreover, it is highly desirable that the construction of the lock be such as to make the removal operation very noisy. Still another desirable property is that the lock be invisible from the exterior of the automobile when the hood is closed, so as to avoid preparing the thief to defeat the lock, and yet be immediately apparent when the usual hood latch is released, so as to discourage further efforts to open the hood and to alert service station attendants to the need for obtaining the key from the owner.

BRIEF DESCRIPTION OF THE INVENTION

It is accordingly a principal object of the present invention to provide an improved hood lock having the foregoing characteristics.

Briefly stated, a hood lock in accordance with the invention comprises a universally flexible chain, one end of which is securely attached to the hood of an automobile by a simple shielded screw fastener and the other end of which is detachably engaged with a key-operated locking mechanism that is easily yet securely attached to a portion of the engine compartment frame.

BRIEF DESCRIPTION OF THE DRAWING

The invention will be further described with reference to the accompanying drawing, which illustrates a preferred and exemplary embodiment, and wherein.

DETAILED DESCRIPTION OF THE INVENTION

Figure 2:
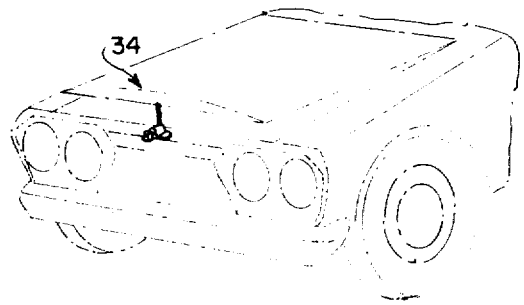
FIG. 2 is a fragmentary perspective view showing the lock as installed upon an automobile, with the hood latch released.
Figure 3:
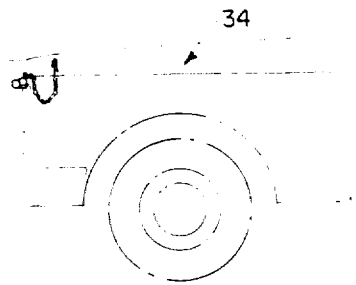
FIG. 3 is a fragmentary side elevation showing the lock as installed in FIG. 2, but with the hood closed.
Figure 1:
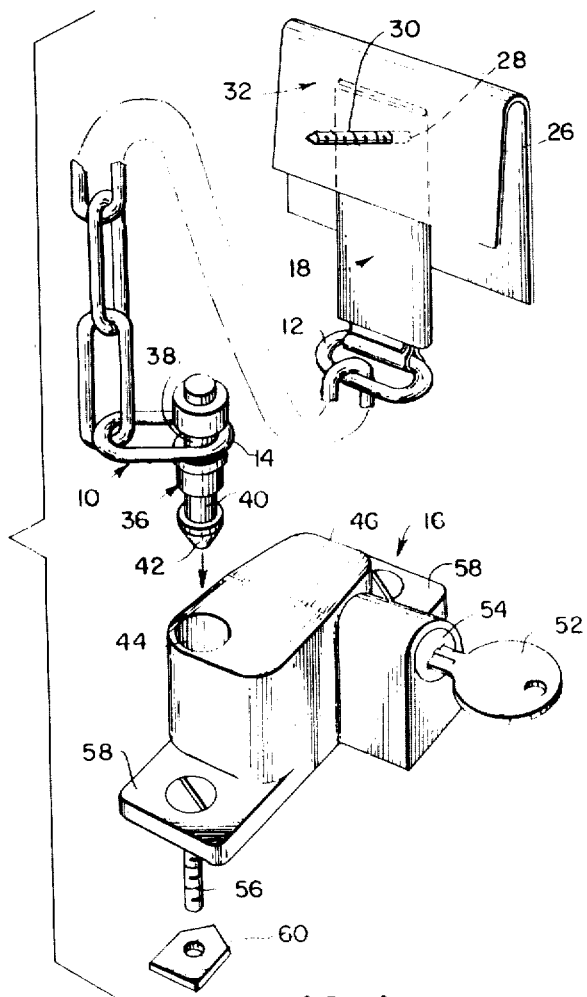
FIG. 1 is an exploded perspective view of the chain lock of the invention.
Figure 4:
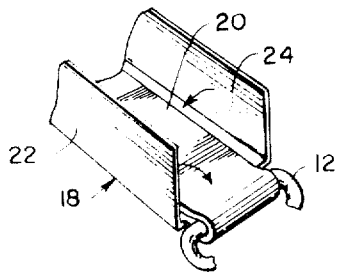
FIG. 4 is a fragmentary perspective view illustrating a detail of the chain attachment.

Referring to the drawing, as best seen in FIG. 1 the hood lock of the invention comprises a link-type chain 10 having one end, 12, adapted to be fixed to the hood of an automobile, and the opposite end, 14, adapted to be detachably engaged with a key-operated lock mechanism 16. The chain 10 has elongate or oval links of strong steel, to resist cutting, and is universally flexible. As shown in FIG. 4, end 12 of the chain is provided with a fastener 18 in the form of a heavy metal plate, one end, 20, of the plate being looped about an elongated leg of the terminal link of the chain and folded back upon itself. Lateral extensions 22 and 24 of the plate are then folded, in overlapping relation, upon end 20, as indicated by the arrows in FIG. 4, so as to secure end 20 against unfolding. End 26 of the plate, opposite to end 20, is provided with a hole 28 which receives a screw 30 as shown in FIG. 1. The screw also passes through a mating hole in a heavy steel guard plate 32, which is then bent back upon fastener 18 as shown in FIG. 1 so as to hide the head of the screw, to protect the fastener plate 18, and to restrict the pivotal movement of the fastener 18 about the screw. The fastener 18 and the guard plate 32 must, of course, be sufficiently malleable to permit the bending operations just described with the aid of heavy tools, but yet should be sturdy enough to resist unbending by pliers and the like. Screw 30 is threaded into a hole bored or pre-formed in a frontal portion of the hood 34 of an automobile as indicated in FIGS. 2 and 3. After the screw has been threaded into place, plate 32, which originally may be flat or L-shaped, is pounded into the inverted U-shape shown in FIG. 1 by means of a heavy hammer.

Figure 5:
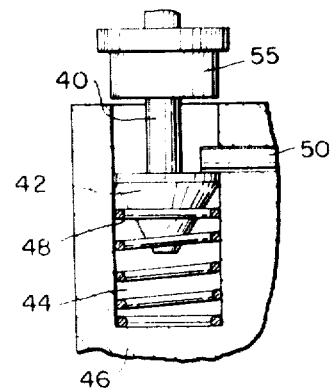
FIG. 5 is a vertical sectional view of a detail of the lock mechanism.

End 14 of the chain is provided with a plug 36 for engaging the lock mechanism 16. The plug is undercut at 38 so as to fit within the final link of the chain at end 14 loosely but securely. It is also undercut at 40 and provided with a tapered head 42. The undercut portion 40 and tapered head 42 enter a well 44 in the body 46 of the lock mechanism as shown in FIG. 5. In so doing, head 42 engages and compresses a coil spring 48 held captive in the well 44. A spring-biased bolt 50 is first retracted from the well 44 by engagement with the tapered head 42 of the plug and then snaps behind the tapered head into the recess provided by the undercut portion 40, so as to retain the plug within the well. Plug head 55 then blocks access to the well 44. Key 52 (FIG. 1) turns the cylinder 54 of the lock mechanism, which retracts the bolt 50 from the well 44 against the bias of the bolt spring (not shown) in a conventional manner (as by a cylinder dog in a notch of the bolt). This releases the plug 36 and permits the spring 48 to eject the plug from the well 44.

The lock mechanism 16 is easily installed upon a frontal frame portion of the engine compartment by means of screws 56 passing through flanges 58 of body 46 and through corresponding holes in the frame member 60 of the engine compartment. The screws may then be bent over beneath the frame member 60 to prevent their removal or, if bolts are used, the threads of the bolts may be lacerated, or non-removal nuts may be employed.

The complete installation of the invention is evident from FIGS. 2 and 3, FIG. 2 showing the taut condition of chain 10 when the usual hood latch has been released, so as to move the hood upwardly by the usual hood spring, and FIG. 3 illustrating the slack condition of the chain when the hood is closed. It is apparent that the hood lock of the invention is hidden from view until the usual latch is released, whereupon the chain becomes immediately visible. Authorized access to the engine compartment merely requires the insertion of the key in the exposed lock mechanism.

By virtue of the construction of the invention the hood lock may be readily installed on almost any automotive vehicle without problems of alignment. The construction of the invention is simple enough to provide an economical hood lock and yet strongly (and noisily) resists removal after installation. The type of chain employed not only promotes easy installation but also serves as an immediate warning that a hood lock is present.

While a preferred embodiment of the invention has been shown and described, it will be apparent to those skilled in the art that changes can be made in this embodiment without departing from the principles and spirit of the invention, the scope of which is defined in the appended claims.

The invention claimed is:

1. Apparatus for securing the engine compartment or the like of an automobile against unauthorized entry, which comprises a universally flexible link-type chain having means at one end thereof for fixing the chain to the hood of the automobile and having means at the opposite end thereof adapted to engage a lock mechanism, and a lock mechanism for engaging the last-mentioned means and adapted to be secured to a portion of the engine compartment, said one end of said chain being provided with a fastener having a screw passing therethrough and with guard means for shielding the head of said screw, said fastener comprising a plate looped about a link of said chain and said guard means comprising a guard plate having a hole therein for the passage of said screw and adapted to be bent back upon itself to embrace said fastener plate and to restrict the pivotal movement of the fastener plate about said screw.

2. Apparatus in accordance with claim 1, said lock mechanism having mounting means including screws adapted to secure the lock mechanism to said portion of the engine compartment.

* * * * *